US009729522B2

(12) United States Patent
McCoy et al.

(10) Patent No.: US 9,729,522 B2
(45) Date of Patent: Aug. 8, 2017

(54) SYSTEM AND METHOD FOR DEVICE AUTHENTICATION

(71) Applicants: SONY CORPORATION, Tokyo (JP); SONY NETWORK ENTERTAINMENT INTERNATIONAL LLC, Los Angeles, CA (US)

(72) Inventors: Charles McCoy, Coronado, CA (US); True Xiong, San Diego, CA (US); Clay Fisher, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/563,570

(22) Filed: Dec. 8, 2014

(65) Prior Publication Data
US 2016/0164852 A1 Jun. 9, 2016

(51) Int. Cl.
  *H04L 29/06* (2006.01)
  *H04L 9/32* (2006.01)
  *H04W 12/06* (2009.01)
  *G06F 21/35* (2013.01)

(52) U.S. Cl.
  CPC .......... *H04L 63/0435* (2013.01); *G06F 21/35* (2013.01); *H04L 9/3226* (2013.01); *H04L 63/061* (2013.01); *H04W 12/06* (2013.01); *H04L 2209/805* (2013.01)

(58) Field of Classification Search
  CPC ....... H04L 63/08; H04L 63/0428; H04L 9/08; H04L 9/32; H04L 9/3271
  USPC .............................................. 713/168; 726/7
  See application file for complete search history.

(56) References Cited

U.S. PATENT DOCUMENTS

| 8,045,961 | B2 | 10/2011 | Ayed et al. | |
| 2003/0236983 | A1* | 12/2003 | Mihm, Jr. ............. | H04L 63/045 713/172 |
| 2011/0099366 | A1* | 4/2011 | Kalliola ................ | G06F 21/606 713/153 |
| 2011/0214158 | A1* | 9/2011 | Pasquero ................ | G06F 21/35 726/2 |
| 2014/0026188 | A1* | 1/2014 | Gubler .................. | H04W 12/08 726/3 |
| 2015/0058942 | A1* | 2/2015 | Dermu .................. | G06F 21/445 726/6 |

(Continued)

FOREIGN PATENT DOCUMENTS

IN    1659/MUM/2013 A    9/2013

OTHER PUBLICATIONS

David Ruddock, "Samsung Galaxy Gear Review: What Am I Supposed to Do With This", (http://www.androidpolice.com/2013/10/04/samsung-galaxy-gear-review-what-am-i-supposed-to-do-with-this/), Oct. 4, 2013, pp. 31.

*Primary Examiner* — Baotran N To
(74) *Attorney, Agent, or Firm* — Chip Law Group (57) ABSTRACT

Various aspects of a system and a method for device authentication are disclosed herein. The system comprises one or more processors in a first communication device. The one or more processors are operable to detect a second communication device within a communication range of the first communication device. The first communication device is in an unlocked state and the second communication device is in a locked state. The first communication device communicates authentication data to unlock the detected second communication device.

22 Claims, 6 Drawing Sheets

(56) References Cited

U.S. PATENT DOCUMENTS

| | | | |
|---|---|---|---|
| 2015/0082406 A1* | 3/2015 | Park | H04L 63/0853 726/9 |
| 2015/0147065 A1* | 5/2015 | Civelli | G08C 23/04 398/107 |
| 2015/0208141 A1* | 7/2015 | Kim | G08C 17/02 340/870.07 |

* cited by examiner

SYSTEM AND METHOD FOR DEVICE AUTHENTICATION

FIELD

Various embodiments of the disclosure relate to device authentication. More specifically, various embodiments of the disclosure relate to device authentication based on authentication information shared between multiple devices.

BACKGROUND

With the advent of new-generation electronic devices, such as smartwatches, smartphones, and/or handheld personal digital assistants, a need for a more secure way of device authentication has increased. Traditionally, a limited-digit personal identification number (PIN) code is used to unlock such electronic devices. However, as users now save substantially more critical data in their new-generation electronic devices, such as an automated teller machine (ATM) codes, and/or bank account details, a need for a higher-level security has become imperative. One way to introduce such high-level security is to increase the length of the PIN codes. However, this may lead to additional time and effort to unlock the electronic devices.

In certain scenarios, the user may desire to quickly use the electronic device for accessing the device fucntionality in just a couple of seconds. For example, the user may face an instant opportunity to click a picture with a smartphone or may want to add contact information or a note without the inconvenience of manually logging into the smartphone. Thus, the user may miss the opportunity to click the picture or may take longer time to log into the smartphone if the user were to provide a lengthy PIN code to access the smartphone. Thus, the existing techniques of authentication to access the electronic device may not always provide a desired level of ease and prompt access to the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method are provided for device authentication substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Exemplary aspects of the disclosure may comprise a system and/or a method for device authentication. The method may comprise detection of a second communication device within a first communication range of the first communication device. The first communication device may be in an unlocked state and the second communication device may be in a locked state. The authentication data may be communicated to unlock the detected second communication device.

In an embodiment, the method may comprise generation of a key value. In an embodiment, the authentication data may be encrypted based on the generated key value. In an embodiment, the encrypted authentication data may be transmitted to the second communication device. In an embodiment, the first communication device may be locked upon detection of a modification in a physical configuration of the first communication device. In an embodiment, the locked first communication device may be unlocked when a tapping event is performed between the unlocked second communication device and the locked first communication device.

In an embodiment, the second communication device may be unlocked or locked when a hardware or a software button at the first communication device may be activated. In an embodiment, the second communication device may be unlocked or locked, via a user interface rendered on the first communication device. In an embodiment, the second communication device may communicate the authentication data to a third communication device. The third communication device may be detected by the second communication device within a second communication range. In an embodiment, the first and the second communication range may correspond to a communication range associated with one of a near field communication (NFC) protocol, a Bluetooth protocol, or another short-range communication protocol.

In an embodiment, the second communication device may be in an unlocked state and the third communication device may be in a locked state. In an embodiment, the second communication device may unlock the third communication device based on the communicated authentication data. In an embodiment, the first communication device may communicate the authentication data to the third communication device to unlock the third communication device. The third communication device may be within the communication range of the first communication device.

Figure 1:
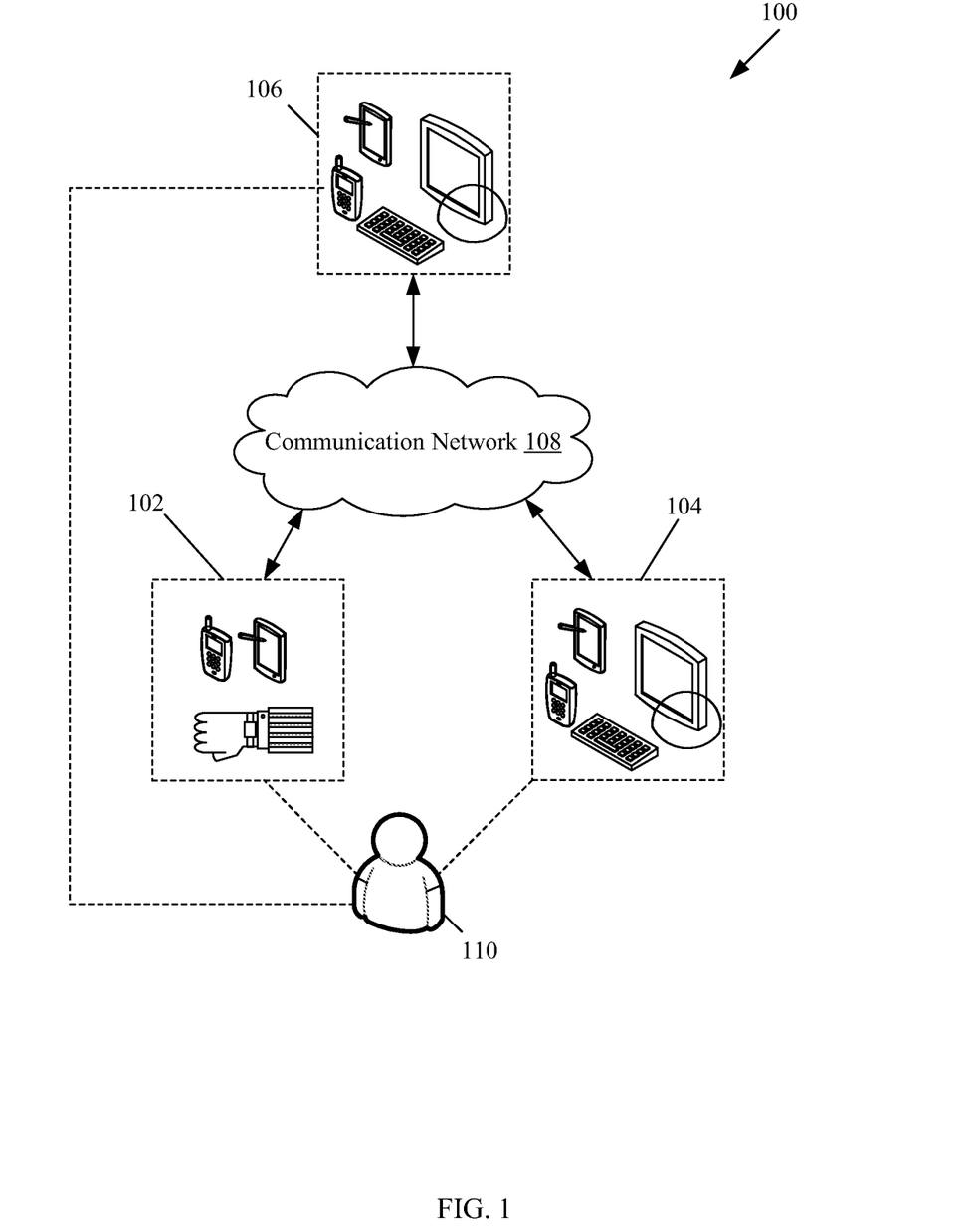
FIG. 1 is a block diagram illustrating a network environment for device authentication, in accordance with an embodiment of the disclosure.

FIG. 1 is a block diagram illustrating a network environment 100 for device authentication, in accordance with an embodiment of the disclosure. The network environment 100 may comprise a plurality of communication devices, such as a first communication device 102, a second communication device 104, and a third communication device 106. The network environment 100 may further comprise a communication network 108, and a user 110.

The first communication device 102 may comprise suitable logic, circuitry, interfaces, and/or code that may communicate with other communication devices, via the communication network 108. In an embodiment, the first communication device 102 may be operable to communicate with the other communication devices for device configuration, via the communication network 108. In an embodiment, an unlocked first communication device 102 may be operable to communicate directly with the other locked communication devices, such as the second communication device 104 and/or the third communication device 106, via the communication network 108. Examples of the first communication device 102, the second communication device 104, and/or the third communication device 106 may include a smartwatch, a tablet, a laptop, a tablet computer, a smart set-top box (STB), a smart video display, a personal digital assistant (PDA) device, a Blu-ray Disc™ player, a mobile device, a smartphone, and/or the like.

The second communication device 104 may comprise suitable logic, circuitry, interfaces, and/or code that may be operable to communicate with the first communication device 102 for device configuration, via the communication network 108. In an embodiment, the locked second communication device 104 may be unlocked by the first communication device 102, via the communication network 108. In an embodiment, the unlocked second communication device 104 may be operable to lock the unlocked first communication device 102, via the communication network 108.

The third communication device 106 may comprise suitable logic, circuitry, interfaces, and/or code that may be operable to communicate with the first communication device 102 and/or the second communication device 104 for device configuration, via the communication network 108. In an embodiment, the first communication device 102 may be operable to allow the second communication device 104 to unlock the third communication device 106, via the communication network 108. In an embodiment, the third communication device 106 may be unlocked by the second communication device 104, via the communication network 108. In an embodiment, the third communication device 106 may be operable to lock the unlocked second communication device 104, via the communication network 108.

The communication network 108 may comprise a wired or wireless medium through which the first communication device 102, the second communication device 104, and the third communication device 106 may communicate with each other for device configuration. The first communication device 102, the second communication device 104, and the third communication device 106 may further detect and unlock each other, via the communication network 108. The communication network 108 may facilitate a first communication range for the first communication device 102 and a second communication range for the second communication device 104. Examples of the communication network 108 may include the Internet, a Metropolitan Area Network (MAN), a local area network (LAN), a Virtual Private Network (VPN), an Ethernet, a wireless short-range network, such as a near-field-communication (NFC) network, a home network, a wireless fidelity (Wi-Fi) network, an ad-hoc wireless network, and/or the like. Various devices in the network environment 100 may be operable to connect to the communication network 108, in accordance with various wired and wireless communication protocols. Examples of wired or wireless communication protocols may include, but are not limited to, Transmission Control Protocol and Internet Protocol (TCP/IP), User Datagram Protocol (UDP), Hypertext Transfer Protocol (HTTP), Secure Hypertext Transfer Protocol (HTTPS), File Transfer Protocol (FTP), Bluetooth, ZigBee, EDGE, infrared (IR), IEEE 802.11, 802.16, other such communication protocols.

In operation, the first communication device 102 may be operable to communicate with the second communication device 104 for device configuration, via the communication network 108. In an embodiment, the device configuration may correspond to registration of the second communication device 104 with the first communication device 102. The registration may involve communication of registration information from the second communication device 104 to the first communication device 102. The registration information may comprise a user profile of the user 110, a device profile of the associated communication device, such as the second communication device 104, and authentication data of the second communication device 104. In an embodiment, the first communication device 102 may be operable to register the one or more communication devices, such as the second communication device 104, via a local Area Wireless & Walkup network (LAWN). In an embodiment, the first communication device 102 may be operable to register one or more communication devices, such as the second communication device 104, via a subscribed web portal. Notwithstanding, the disclosure may not be so limited, and other techniques to register the one or more communication devices may be implemented, without limiting the scope of the disclosure.

In an embodiment, the authentication data may comprise a personal identification number (PIN) of the second communication device 104, credentials of the user 110 associated with the second communication device 104, a media access control (MAC) address that corresponds to one or more network interfaces of the second communication device 104, and/or the like. In an embodiment, the first communication device 102 and the second communication device 104 may share the same authentication data. In such an embodiment, the second communication device 104 may not have to communicate the authentication data to the first communication device 102. In such an embodiment, a local memory of the first communication device 102 may comprise pre-stored registration information associated with one or more registered communication devices. In an embodiment, the first communication device 102 may be associated with a third-party server to receive the registration information associated with one or more communication devices and store the received registration information in the local memory. In an embodiment, the first communication device 102 may communicate a token to the second communication device 104. In another embodiment, the first communication device 102 may respond to a request from the second device 104 based on a shared secret key information. The shared secret key information may be communicated when the first communication device 102 is registered with second communication device 104. Consequently, the second communication device 104 may determine that the first communication device 102 is aware of the shared secret key information even though the shared secret key information is not communicated during the unlocking operation. Notwithstanding, the disclosure may not be so limited, and various techniques to pre-store the registration information may be implemented, without limiting the scope of the disclosure.

In an embodiment, the second communication device 104 may communicate the authentication data to the first communication device 102, via the communication network 108, based on standard security protocols, such as a secure socket layer (SSL) protocol. Based on the SSL protocol, a communication link between the first communication device 102 and the second communication device 104 may be encrypted. Such an encryption of the communication link may ensure a secure transmission of the authentication data from the second communication device 104 to the first communication device 102, for the device configuration. In an embodiment, the authentication data may be securely communicated by the second communication device 104 to the first communication device 102, for device configuration, based on public-key cryptography. Notwithstanding, the disclosure may not be so limited, and other techniques for secure communication of the authentication data may be implemented, without limiting the scope of the disclosure. In an embodiment, the first communication device 102 may acknowledge the receipt of the authentication data from the second communication device 104, via the communication network 108.

In an embodiment, the first communication device 102 may be in an unlocked state and the second communication device 104 may be in a locked state. In an embodiment, the first communication device 102 may be operable to detect the second communication device 104, when the second communication device 104 is within the first communication range of the first communication device 102. In an embodiment, first communication range of the first communication device 102 may correspond to the communication network 108. Such a communication, via the communication network 108, may be performed based on short-range communication protocols. The short-range communication protocols may include NFC protocols, Bluetooth protocols, proximity sensor-based protocols, and/or the like. In an embodiment, the first communication device 102 may detect the second communication device 104 based on the registration information stored in the local memory of the first communication device 102.

In an embodiment, the first communication device 102 may transmit the authentication data to the second communication device 104, when one or more pre-specified events are performed. The one or more pre-specified events may include a tapping event between the first communication device 102 and the second communication device 104. Notwithstanding, the disclosure may not be so limited and a tapping event may include a physical touching of the first communication device 102 and the second communication device 104 or the first communication device 102 may be within a close proximity of the second communication device 104 without limiting the scope of the disclosure. In an embodiment, the first communication device 102 may be operable to transmit the authentication data, via the communication network 108. In an embodiment, the first communication device 102 may retrieve the authentication data of the second communication device 104 from the registration information stored in the local memory.

In an embodiment, the first communication device 102 may transmit an encrypted authentication data to the detected second communication device 104, via the communication network 108. The encrypted authentication data may be securely transmitted to the detected second communication device 104, based on various secure communication techniques known in the art.

In an embodiment, the detected second communication device 104 may receive the encrypted authentication data from the first communication device 102. In an embodiment, the detected second communication device 104 may decrypt the encrypted authentication data received from the first communication device 102. In an instance, the authentication data may not match master authentication data pre-stored in a local memory of the detected second communication device 104. In an embodiment, the detected second communication device 104 may display an error signal and the detected second communication device 104 may not be unlocked. In an embodiment, the detected second communication device 104 may transmit the error signal to the first communication device 102. In another instance, the authentication data may match the master authentication data pre-stored in the local memory. The detected second communication device 104 may be unlocked. In such an unlocked state, the second communication device 104 may allow access to one or more applications and/or features of the second communication device 104.

In an embodiment, the user 110 may perform a confirmatory action to unlock the locked second communication device 104. The confirmatory action may be performed via an interaction with the user interface rendered at a display screen of the unlocked first communication device 102. For example, when a locked cell phone is touched with an unlocked smart watch, the smart watch may display a user interface element on a user interface rendered at a display screen of the unlocked smart watch. The user 110 may touch or swipe the user interface element to unlock the cell phone. A swipe in the other direction may cancel the unlock action initiated by the touch. In an embodiment, the user interface rendered at the display screen of the unlocked first communication device 102 may initiate the unlock operation without the need to interact with the user interface rendered at the display screen of the unlocked first communication device 102. In such a case, the locked second communication device 104 may be communicated the confirmatory action via other input/output devices other than the display screen.

In an embodiment, the first communication device 102 may be operable to lock the unlocked second communication device 104. In an embodiment, the first communication device 102 may be operable to lock the unlocked second communication device 104, based on an activation of a hardware or a software button at the first communication device 102. In an embodiment, the first communication device 102 may be operable to lock the unlocked second communication device 104, via the user interface rendered at the display screen of the first communication device 102.

In an embodiment, the user 110 may modify the physical configuration of the associated first communication device 102. For example, the first communication device 102 may be a smartwatch fastened on the wrist of the user 110. The modification in the physical configuration may correspond to unfastening the smartwatch from the wrist of the user 110. Based on the modification in the physical configuration, the state of the first communication device 102 may be changed from the unlocked state to a locked state. In an embodiment, based on a duration of inactivity that exceeds a pre-specified threshold, the state of the first communication device 102 may be changed from the unlocked state to a locked state.

In an embodiment, the unlocked second communication device 104 may be operable to change the state of the first communication device 102, based on one or more pre-specified events performed by the user 110. The one or more pre-specified events may include an event where the second communication device 104 may be tapped with the first communication device 102, a hardware or a software button may be activated at the second communication device 104, and/or the like. In an embodiment, a locked device, such as the second communication device 104, may have user accounts for a plurality of users. The first communication device 102 may be unlocked and logged into based on a user account of a user. The second communication device 104 may be unlocked based on the user account of the same user that is logged into the first communication device 102. For example, an unlocked device, such as the first communication device 102, may be logged into based on a user account of the user 110. The second communication device 104, may be touched by the unlocked first communication device 102, and may be unlocked based on the user account of the user 110.

In an embodiment, the first communication device 102 may be operable to allow the unlocked second communication device 104 to communicate with a third communication device 106, for device configuration, via the communication network 108. The device configuration may correspond to registration of the third communication device 106 with the first communication device 102 and/or the second communication device 104. The registration may involve communication of registration information from the third communication device 106 to the first communication device 102 and/or the second communication device 104, via the communication network 108. The registration information may comprise a user profile of the user 110, a device profile of the associated communication device, such as the third communication device 106, and authentication data of the third communication device 106. Such communication of the registration information may be similar to the communication of the registration information from the second communication device 104 to the first communication device 102, as already explained above.

In an embodiment, based on the registration information, the first communication device 102 may detect the locked third communication device 106 when the locked third communication device 106 is within the first communication range. In an embodiment, based on the registration information, the second communication device 104 may detect the locked third communication device 106 when the locked third communication device 106 is within the second communication range.

In an embodiment, the first communication device 102 may transmit the authentication data to the locked third communication device 106, via the communication network 108, based on one or more pre-specified events. The one or more pre-specified events may include a tapping event between the first communication device 102 and the third communication device 106. In an embodiment, the first communication device 102 may allow the second communication device 104 to transmit the authentication data to the locked third communication device 106, via the communication network 108, based on one or more pre-specified events. The one or more pre-specified events may include a tapping event between the second communication device 104 and the third communication device 106.

Subsequently, the first communication device 102 may unlock the third communication device 106, via the communication network 108. In an embodiment, the first communication device 102 may allow the second communication device 104 to unlock the third communication device 106. In such an embodiment, the second communication device 104 may unlock the third communication device 106 via the communication network 108. The third communication device 106 may be detected and unlocked in a similar way as the second communication device 104 is detected and unlocked, already explained above.

In an embodiment, the first communication device 102 and/or the second communication device 104 may be operable to change the state of the third communication device 106. The change in the state may be from the unlocked state to a locked state, or from the locked state to the unlocked state after the third communication device 106 is detected. Such a state change of the third communication device 106 may be performed when a hardware or software button at the first communication device 102 and/or the second communication device 104 is activated. In an embodiment, the change in the state of the third communication device 106 may be performed via the user interface rendered at a display screen of the first communication device 102 and/or the second communication device 104.

In an embodiment, the third communication device 106 may be operable to change the state of the first communication device 102 and/or the second communication device 104 based on one or more pre-specified events. The one or more pre-specified events may include a tapping event between the third communication device 106 and the second communication device 104, a tapping event between the third communication device 106 and the first communication device 102, an activation of a hardware or a software button at the third communication device 106, and/or the like.

Figure 2:
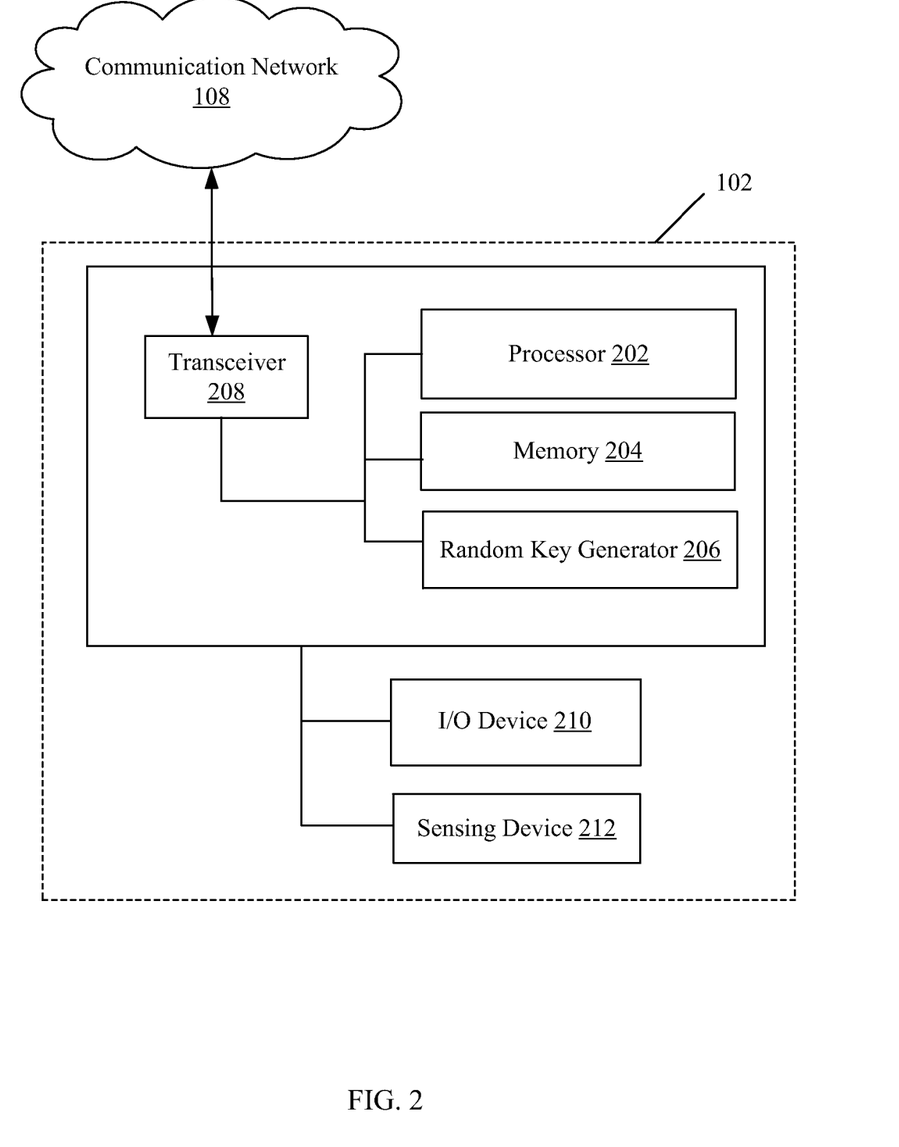
FIG. 2 is a block diagram illustrating an exemplary communication device, in accordance with an embodiment of the disclosure.

FIG. 2 is a block diagram illustrating an exemplary communication device, in accordance with an embodiment of the disclosure. FIG. 2 is explained in conjunction with elements from FIG. 1. With reference to FIG. 2, there is shown the first communication device 102. The first communication device 102 may comprise one or more processors, such as a processor 202, a memory 204, a random key generator 206, a transceiver 208, one or more input/output (I/O) devices, such as an I/O device 210, and a sensing device 212. The processor 202 may be communicatively coupled with the memory 204, the random key generator 206, the transceiver 208, the I/O device 210, and the sensing device 212. The transceiver 208 may be communicatively coupled with the other communication devices, via the communication network 108.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may comprise suitable logic, circuitry, interfaces, and/or code that may be operable to store the set of instructions executable by the processor 202. The memory 204 may store the registration information of the one or more registered communication devices. The memory 204 may further store a private key associated with the first communication device 102 and a list of public keys associated with other communication devices, such as the second communication device 104. The memory 204 may further store symmetric-key encryption algorithms, which may be executed by the processor 202, when the authentication data is encrypted. The memory 204 may further store a plurality of short-range communication protocols, such as NFC protocol or Bluetooth protocol. The memory 204 may further store a plurality of secure socket layer communication (SSL) protocols, such as SSL protocol. The memory 204 may be implemented by the use of various multimedia database management systems that are well known to those skilled in the art. The memory 204 may be implemented based on, but not limited to, a Random Access Memory (RAM), a Read-Only Memory (ROM), a Hard Disk Drive (HDD), a storage server and/or a Secure Digital (SD) card.

The random key generator 206 may comprise suitable logic, circuitry, interfaces, and/or code that may be operable to generate a random sequence of numbers or symbols that lack a pattern. Such a random sequence of numbers or symbols may be utilized for a secure communication of authentication data between the one or more communication devices. The random key generator 206 may be implemented via a pseudorandom number generator (PRNG), a hardware random number generator (TRNG), a random number server, a cryptographic algorithm, and/or the like.

The transceiver 208 may comprise suitable logic, circuitry, interfaces, and/or code that may be operable to communicate with other communication devices, via various communication interfaces. The transceiver 208 may implement known technologies for supporting wired or wireless communication with the communication network 108. Examples of the transceiver 208 may include, but are not limited to, an antenna, a radio frequency (RF) transceiver, one or more amplifiers, a tuner, one or more oscillators, a digital signal processor (DSP), a coder-decoder (CODEC) chipset, a subscriber identity module (SIM) card, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use a plurality of communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 210 may comprise suitable logic, circuitry, interfaces, and/or code that may be operable to receive an input from the user 110 or provide an output to the user 110. The I/O device 210 may comprise various input and output devices that may be operable to communicate with the processor 202. Examples of the input devices may include, but are not limited to, a keyboard, a mouse, a joystick, a touch screen, a microphone, a camera, and/or a docking station. Examples of the output devices may include, but are not limited to, a display screen, and/or a speaker.

The sensing device 212 may comprise suitable logic, circuitry, and/or interfaces that may be operable to include one or more sensors. The one or more sensors may be configured to detect one or more communication devices within the first communication range of the first communication device 102. The one or more sensors may include an image sensor, a motion sensor, an NFC sensor, a proximity sensor, and/or the like.

In operation, the transceiver 208 may be operable to receive registration information from the second communication device 104 for device configuration, via the communication network 108. The registration information may comprise a user profile of the user 110, a device profile of the second communication device 104, and authentication data of the second communication device 104. The authentication data may comprise a PIN of the second communication device 104, such as, "4528109125". In an embodiment, the authentication data may comprise credentials of the user 110 associated with the second communication device 104, such as, "username@xyz.com/password123". In another embodiment, the authentication data may comprise a MAC address that corresponds to one or more network interfaces of the second communication device 104, such as, "00:0a:95:9d:68:16". Notwithstanding, the disclosure may not be so limited, and the authentication data may comprise other data, without limiting the scope of the disclosure.

In an embodiment, the processor 202 may be operable to store the received registration information of the one or more communication devices, such as the second communication device 104, in the memory 204. In an embodiment, the registration information for the second communication device 104 may be stored in the memory in one or more formats, such as, "<Device name of the second communication device 104>:<username>:<username@xyz.com/password123>".

In an embodiment, the first communication device 102 and the second communication device 104 may share the same authentication data. In such an embodiment, the second communication device 104 may not have to communicate the authentication data to the transceiver 208 as the authentication data may be pre-stored in the memory 204.

In an embodiment, the processor 202 may be operable to register the one or more communication devices, such as the second communication device 104, via the communication network 108. In an embodiment, the processor 202 may be operable to register the one or more communication devices, such as the second communication device 104, via a subscribed web portal. Notwithstanding, the disclosure may not be so limited, and other techniques to register the one or more communication devices may be implemented, without limiting the scope of the disclosure.

In an embodiment, the transceiver 208 may receive the registration information from the second communication device 104, via the communication network 108, based on standard security protocols, such as an SSL protocol. Based on the SSL protocol, a communication link may provide a secure transmission of the registration information from the second communication device 104 to the transceiver 208. Notwithstanding, the disclosure may not be so limited, and other techniques for secure communication of the authentication data may be implemented, without limiting the scope of the disclosure.

In an embodiment, the registration information may comprise encrypted authentication data. In such an embodiment, the processor 202 may be operable to decrypt the received encrypted authentication data and communicate to the memory 204. In an embodiment, the processor 202 may be operable to acknowledge the secure receipt of the authentication data from the second communication device 104.

In an embodiment, the first communication device 102 may be associated with the user 110 and may be in an unlocked state and the second communication device 104 may be in a locked state. In an embodiment, the sensing device 212 may be operable to detect the second communication device 104 when the second communication device 104 is within the first communication range of the first communication device 102. In an embodiment, the transceiver 208 and the second communication device 104 may communicate with each other, via the communication network 108.

In an embodiment, the processor 202 may retrieve the authentication data of the second communication device 104 from the registration information stored in the memory 204. In an embodiment, the processor 202 may be operable to transmit the authentication data to the detected second communication device 104, when one or more pre-specified events are performed. The one or more pre-specified events may include a tapping event between the first communication device 102 and the second communication device 104. In an embodiment, the processor 202 may be operable to transmit the authentication data, via the communication network 108.

In an embodiment, the processor 202 may be operable to encrypt the authentication data based on a random key generated by the random key generator 206. In such an embodiment, the processor 202 may be operable to encrypt the random key based on a public key received from the detected second communication device 104. In such an embodiment, the processor 202 may securely transmit the encrypted authentication data and the encrypted random key to the detected second communication device 104. In an embodiment, the encrypted authentication data may be received by the detected second communication device 104 from the transceiver 208, via the communication network 108. In an embodiment, the encrypted authentication data may be decrypted by the detected second communication device 104.

In an embodiment, the processor 202 may receive an error signal when the decrypted authentication data does not match the master authentication data pre-stored in a local memory at the detected second communication device 104. In such an embodiment, the processor 202 may not unlock the detected second communication device 104. In an embodiment, the decrypted authentication data may match the master authentication data pre-stored in the local memory at the detected second communication device 104. In such an embodiment, the processor 202 may unlock the detected second communication device 104. In such an unlocked state, the second communication device 104 may allow access to one or more applications and/or features of the second communication device 104.

In an embodiment, the processor 202 may be operable to change the state of the unlocked second communication device 104 when a hardware or software button at the first communication device 102 is activated. In an embodiment, the processor 202 may be operable to change the state of the unlocked second communication device 104, via the user interface rendered at the display screen of the first communication device 102.

In an embodiment, the user 110 may modify the physical configuration of the associated first communication device 102. Based on such a modification of the physical configuration, the processor 202 may be operable to change the state of the first communication device 102 from the unlocked state to a locked state. In an embodiment, based on a duration of inactivity that exceeds a pre-specified threshold, the processor 202 may be operable to change from the unlocked state to a locked state.

In an embodiment, the processor 202 may be operable to change the state of the first communication device 102 from unlocked state to locked state based on one or more pre-specified events performed by user 110. The one or more pre-specified events may include a tapping event between the second communication device 104 and the first communication device 102, or an activation of hardware or software button at the second communication device 104, and/or the like.

In an embodiment, the processor 202 may be operable to allow the second communication device 104 to communicate with the third communication device 106 for device configuration, via the communication network 108. The device configuration may correspond to registration of the third communication device 106 with one or both of the first communication device 102 and the second communication device 104.

In an embodiment, the processor 202 and/or the other processor may be further operable to receive the registration information from the third communication device 106 for the device configuration, via the communication network 108. In an embodiment, the first communication device 102, the second communication device 104, and the third communication device 106, share the same authentication data. In such an embodiment, the third communication device 106 may not have to communicate the authentication data to the processor 202 and/or the other processor. The memory 204 and/or another memory of the second communication device 104 may store the received registration information of one or more registered communication devices. Various techniques known in the art for registration of the one or more communication devices may be implemented, without limiting the scope of the disclosure.

In an embodiment, the processor 202 may receive the authentication data from the third communication device 106, via the communication network 108, based on standard security protocols, such as an SSL protocol. Based on the SSL, encryption of the communication link between the transceivers of the second communication device 104 and the third communication device 106 may be similar to the encryption of the communication link between the transceivers of the first communication device 102 and the second communication device 104, as explained above.

In an embodiment, the processor 202 may allow the other processor associated with the user 110 to communicate with the third communication device 106, based on the registration information of the third communication device 106 stored in the memory 204. In an embodiment, the processor 202 may be operable to detect the third communication device 106 (in a locked state) when the third communication device 106 is within the first communication range of the first communication device 102. In an embodiment, the processor 202 may allow the second communication device 104 to detect the third communication device 106 when the third communication device 106 is within the second communication range of the second communication device 104. Such a communication via the communication network 108, may be performed based on NFC protocols, Bluetooth protocols, proximity sensor-based protocols, or other short-range communication protocols.

In an embodiment, the processor 202 may be operable to transmit the authentication data to the third communication device 106, via the communication network 108, based on one or more pre-specified events. The one or more pre-specified events may include a tapping event between the first communication device 102 and the third communication device 106. In an embodiment, the processor 202 may be operable to allow the second communication device 104 to transmit the authentication data to the third communication device 106, via the communication network 108, based on the one or more pre-specified events. The one or more pre-specified events may include a tapping event between the second communication device 104 and the third communication device 106.

In an embodiment, the authentication data may be securely transmitted to the third communication device 106, based on the various secure communication techniques, as discussed above. Notwithstanding, any other secure communication technique may be utilized without limiting the scope of the disclosure. In an embodiment, the third communication device 106 may receive the encrypted authentication data transmitted by the first communication device 102, via the communication network 108. In an embodiment, the third communication device 106 may receive the encrypted authentication data transmitted by the second communication device 104, via the communication network 108.

In an embodiment, the third communication device 106 may decrypt the encrypted authentication data transmitted by the first communication device 102 or the second communication device 104. In an embodiment, the decrypted authentication data may not match master authentication data, pre-stored in a local memory of the third communication device 106. In an embodiment, the processor 202 may receive an error signal from the third communication device 106 and the state of the third communication device 106 may not be changed to an unlocked state. In an embodiment, the decrypted authentication data may match the master authentication data pre-stored in the local memory. The first communication device 102 and/or the second communication device 104 may be operable to change the state of the third communication device 106 to unlocked state. When unlocked, the user 110 may be operable to access one or more applications and/or features of the third communication device 106.

In an embodiment, the first communication device 102 and/or the second communication device 104 may be operable to change the state of the unlocked third communication device 106 when a hardware or a software button at the first communication device 102 and/or the second communication device 104 is activated. In an embodiment, the first communication device 102 and/or the second communication device 104 may be operable to change the state of the unlocked third communication device 106, via the user interface rendered at the display screen of the first communication device 102 and/or the second communication device 104.

In an embodiment, the third communication device 106 may be operable to change the state of the first communication device 102 and/or the second communication device 104 based on one or more pre-specified events. The one or more pre-specified events may include an event where the third communication device 106 may touch the second communication device 104, the third communication device 106 may touch the first communication device 102, a hardware or software button at the third communication device 106 may be activated, and/or the like.

Figure 3:
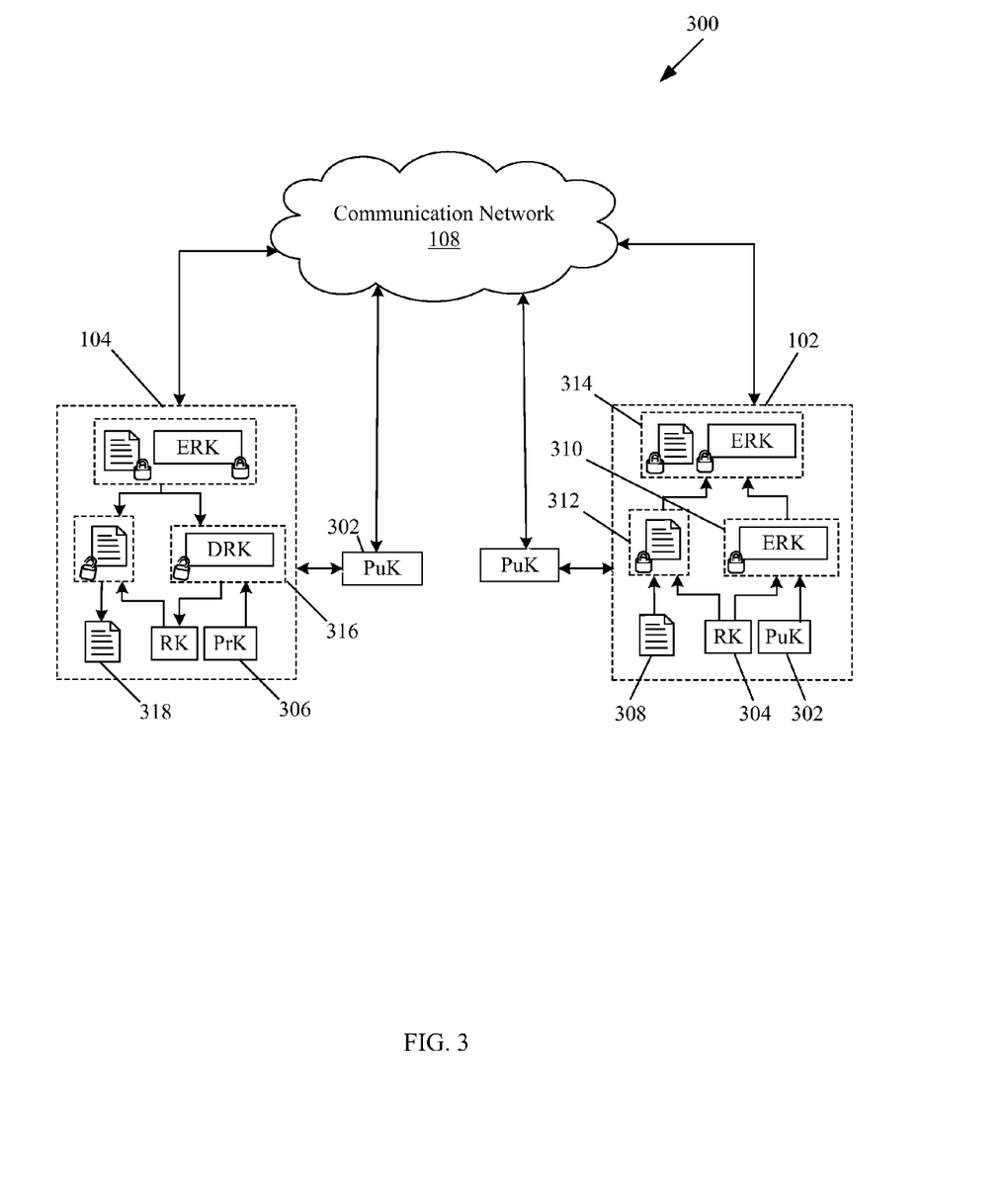
FIG. 3 illustrates an implementation of the disclosed system and method for device authentication, in accordance with an embodiment of the disclosure.

FIG. 3 illustrates an implementation of the disclosed system and method for device authentication, in accordance with an embodiment of the disclosure. FIG. 3 is explained in conjunction with elements from FIG. 1 and FIG. 2. With reference to FIG. 3, there is explained a pretty good privacy (PGP) technique 300 for the device authentication. With reference to the PGP technique 300, there is shown the first communication device 102, the second communication device 104, and the communication network 108. There is further shown a public key (PuK) 302, a random key (RK) 304, and a private key (PrK) 306. There is further shown a source file 308, an encrypted random key (ERK) 310, and an encrypted source file 312. There is further shown an encrypted message 314, a decrypted random key (DRK) 316, and a target file 318.

The PuK 302 may comprise suitable logic, interfaces, and/or code that may be a long random number associated with the second communication device 104. The second communication device 104 may transmit the PuK 302 to other communication devices, such as the first communication device 102, via the communication network 108. The PuK 302 may be operable to encrypt the RK 304 based on one or more public key algorithms. The one or more public key algorithms may be based on key distribution and secrecy, such as a Diffie-Hellman key exchange algorithm, digital signatures, such as Digital Signature Algorithm, and/or both key distribution and digital signatures, such as Ron Rivest, Adi Shamir and Leonard Adleman (RSA) algorithm.

The RK 304 may comprise suitable logic, interfaces, and/or code that may represent a shared secret key between the first communication device 102 and the second communication device 104. The shared secret key may be used to maintain a private information link, via the communication network 108. The RK 304 may be operable to provide an additional security layer to the authentication data communicated from the first communication device 102 to the second communication device 104. In an embodiment, the RK 304 may be utilized to encrypt the source file 308, which may comprise the authentication data, at the first communication device 102. In an embodiment, the RK 304 may be utilized to decrypt the encrypted source file 312 at the second communication device 104. In an embodiment, the RK 304 may be generated by the random key generator 206 in the first communication device 102. The RK 304 may be implemented based on one or more symmetric algorithms. The one or more symmetric algorithms may include Twofish algorithm, Serpent algorithm, Advanced Encryption Standard (AES) algorithm, Blowfish algorithm, Carlisle Adams and Stafford Tavares 5 (CAST5) algorithm, RC4 algorithm, Data Encryption Standard (DES) algorithm, International Data Encryption Algorithm (IDEA) algorithm, and/or the like.

The PrK 306 may comprise suitable logic, interfaces, and/or code that may comprise a long random number associated with the second communication device 104. The PrK 306 may be mathematically related to the PuK 302. The PrK 306 may remain confidential to the second communication device 104 and may never be transmitted to another communication device.

The source file 308 may be a data file that may comprise the authentication data that may be communicated by the first communication device 102 to the second communication device 104, via the communication network 108. The ERK 310 may be the source file 308 encrypted by the RK 304 at the first communication device 102. The encrypted source file 312 may be the source file 308, encrypted by the RK 304 at the first communication device 102. The encrypted message 314 may be generated based on an encapsulation of the ERK 310 and the encrypted source file 312. The ERK 310 may be decrypted based on the PrK 306 to generate DRK 316. The target file 318 may be generated based on a decryption of the encrypted source file 312. The target file 318 may be similar to the source file 308, as explained above. The target file 318 may comprise the authentication data received by the second communication device 104, via the communication network 108.

In operation, the second communication device 104 may be detected by the first communication device 102 when the second communication device 104 is within the first communication range of the first communication device 102. In an embodiment, the first communication device 102 may display a list of available locked devices that may be unlocked. The list of available locked devices may include the locked second communication device 104. In such a case, the user 110 may manually select one locked device, such as the locked second communication device 104, from the list of available locked devices, via the user interface rendered at the display screen of the first communication device 102. In an embodiment, the locked second communication device 104 may display a list of available unlocked devices that may be used to unlock the second communication device 104. The list of available unlocked devices may include the unlocked first communication device 102. In such a case, the user 110 may manually select one unlocked device, such as the unlocked first communication device 102, from the list of available unlocked devices, via a user interface rendered at a display screen at the second communication device 104.

In an embodiment, one or more pre-specified events may be performed between the first communication device 102 and the second communication device 104. In response to the tapping event, the first communication device 102 may retrieve the source file 308 from the memory 204. The source file 308 may comprise authentication data of the second communication device 104. In an embodiment, the retrieved source file 308 may be encrypted and communicated to the first communication device 102, based on one or more cryptographic techniques. In an embodiment, one or more communication devices, such as the second communication device 104, may transmit the PuK 302 to the first communication device 102. The first communication device 102 may be operable to encrypt the source file 308 with the RK 304 to generate the encrypted source file 312. The first communication device 102 may be further operable to encrypt the RK 304 with the PuK 302. The PuK 302 may encrypt the RK 304 to generate the ERK 310. The first communication device 102 may be operable to encapsulate the ERK 310 and the encrypted source file 312 into an encrypted message 314. The first communication device 102 may be operable to transmit the encrypted message 314 to the second communication device 104, via the communication network 108.

The second communication device 104 may be operable to receive the encrypted message 314 from the first communication device 102. The second communication device 104 may decapsulate the encrypted message 314 to retrieve the ERK 310 and the encrypted source file 312. The second communication device 104 may decrypt the ERK 310 based on the PrK 306, which may generate the DRK 316. The second communication device 104 may further decrypt the encrypted source file 312, based on the DRK 316, which may generate the target file 318. The second communication device 104 may be operable to extract the authentication data from the target file 318.

In an embodiment, the authentication data extracted from the target file 318 may not match the master authentication data pre-stored in a local memory of the second communication device 104. The second communication device 104 may display an error signal and the second communication device 104 may not be unlocked. In an embodiment, the extracted target file 318 may match the master authentication data. The second communication device 104 may be unlocked and the user 110 may be operable to access one or more applications and/or features of the second communication device 104. Notwithstanding, the disclosure may not be so limited, and the PGP technique 300 may be implemented for communication of the authentication data between the first communication device 102, the second communication device 104, and/or the third communication device 106, for device configuration via the communication network 108, without limiting the scope of the disclosure.

Figure 4:
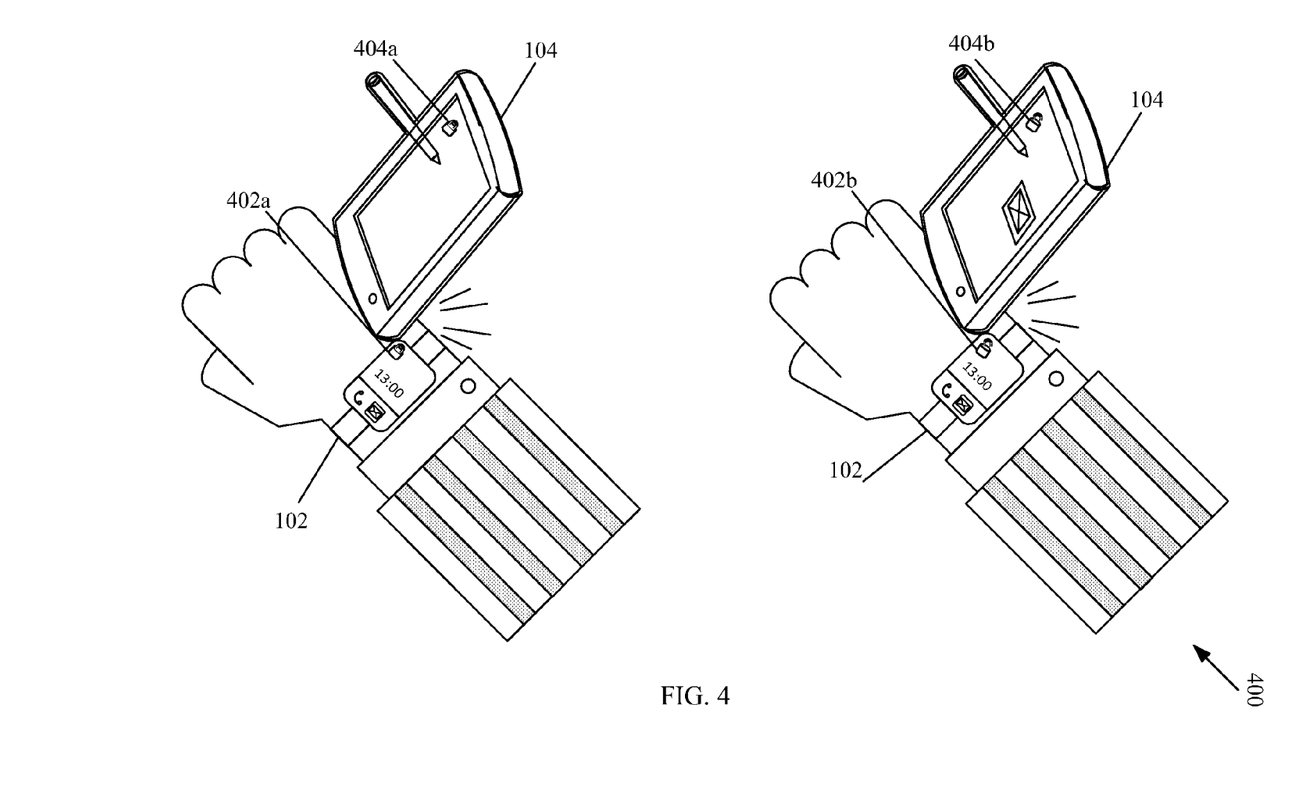
FIG. 4 illustrates a first exemplary scenario for implementing the disclosed system and method for device authentication, in accordance with an embodiment of the disclosure.

FIG. 4 illustrates a first exemplary scenario 400 for implementing the disclosed system and method for device authentication, in accordance with an embodiment of the disclosure. FIG. 4 is described in conjunction with elements of FIG. 1 to FIG. 3. With reference to FIG. 4, there is shown the first communication device 102 (such as a smartwatch), the second communication device 104 (such as a tablet), a first lock icon 402a, a first unlock icon 402b, a second lock icon 404a, and a second unlock icon 404b.

The first lock icon 402a and the first unlock icon 402b may be rendered on a display screen of the smartwatch. The first lock icon 402a may indicate that the smartwatch is locked. The first unlock icon 402b may indicate the smartwatch may be unlocked. The second lock icon 404a and the second unlock icon 404b may be rendered on a display screen of the tablet. The second lock icon 404a may indicate the tablet may be locked. The second unlock icon 404b may indicate the tablet may be unlocked.

With reference to the first exemplary scenario 400, the tablet may be registered with the smartwatch, via the communication network 108. The smartwatch may be locked, as indicated by the first lock icon 402a. The user 110 may carry the tablet within a proximity of the smartwatch. The user 110 may touch the tablet with the smartwatch, via a bumping or tapping event. However, when the smartwatch is locked, as indicated by the first lock icon 402a, the state of the tablet may remain unchanged, as indicated by the second lock icon 404a. In an embodiment, the smartwatch may be unlocked, as indicated by the first unlock icon 402b. In such an embodiment, when the tablet is detected to be within the first communication range of the smartwatch and the tapping event is performed between the smartwatch and the tablet, the tablet may be unlocked, as indicated by the second unlock icon 404b. In an embodiment, the tablet may be not be registered with the smartwatch. In such an embodiment, the smartwatch may neither detect the tablet nor may unlock the tablet.

Figure 5:
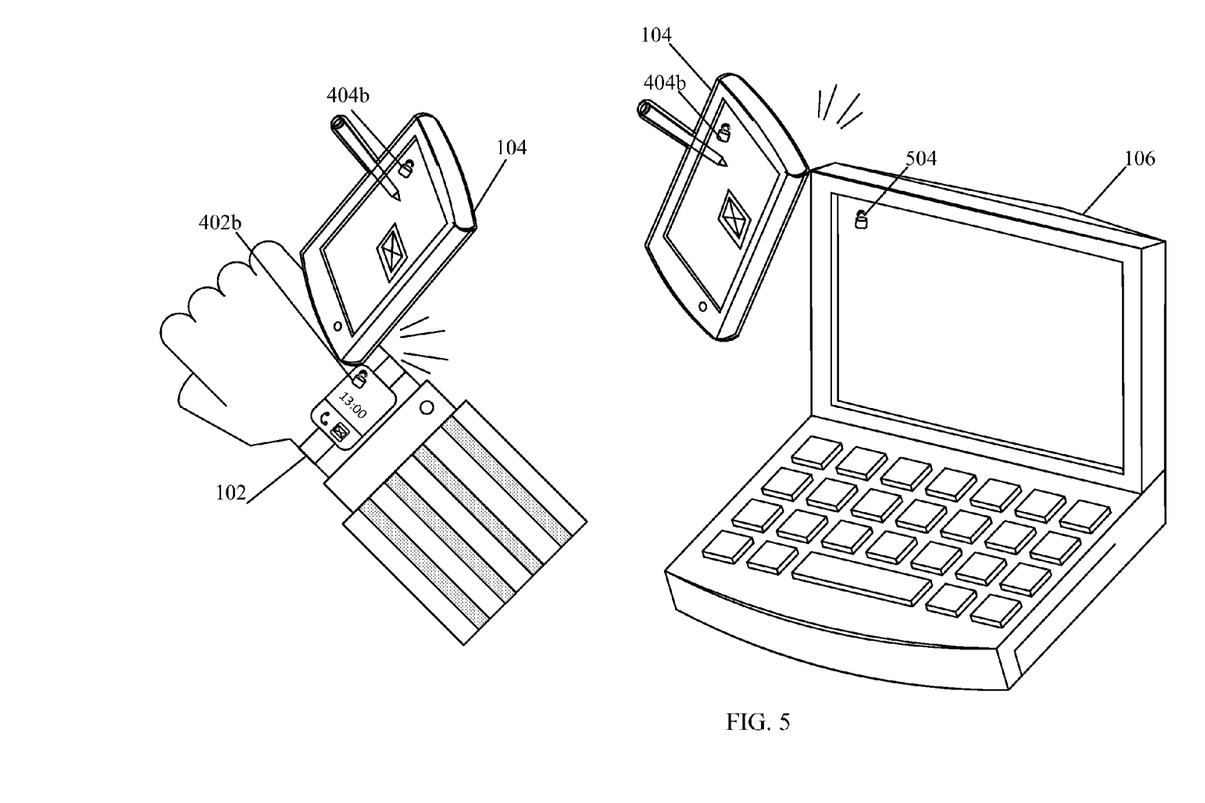
FIG. 5 illustrates a second exemplary scenario for implementing the disclosed system and method for device authentication, in accordance with an embodiment of the disclosure.

FIG. 5 illustrates a second exemplary scenario 500 for implementing the disclosed system and method for device authentication, in accordance with an embodiment of the disclosure. FIG. 5 is described in conjunction with elements of FIG. 1 to FIG. 4. With reference to FIG. 5, there is shown the first communication device 102 (such as the smartwatch), the second communication device 104 (such as the tablet), the third communication device 106 (such as a laptop), the first unlock icon 402b, the second unlock icon 404b, a third lock icon (not shown), and a third unlock icon 504.

The third lock icon may be rendered on a display screen of the laptop. The third lock icon may indicate that the laptop may be currently locked. The third unlock icon 504 may indicate the laptop may be unlocked.

With reference to the second exemplary scenario 500, the tablet may be registered with the smartwatch, via the communication network 108. The laptop may be registered with the smartwatch and/or the tablet, via the communication network 108. The user 110 may carry the tablet within a proximity of the smartwatch. The smartwatch may be unlocked, as indicated by the first unlock icon 402b. The smartwatch may detect the tablet when the tablet is within the first communication range of the smartwatch. The user 110 may touch the detected tablet with the smartwatch, via a bumping or tapping event, and the tablet may be unlocked, as indicated by the second unlock icon 404b, as explained in FIG. 4.

In an embodiment, the user 110 may carry the locked laptop within a proximity of the unlocked tablet. The user 110 may touch the locked laptop with the unlocked tablet, via a bumping or tapping event, and the laptop may be unlocked, as indicated by the third unlock icon 504. Thus, the user 110 may be operable to access one or more applications and/or features of the laptop.

In an embodiment, the tablet may be inoperable due to a battery level less than a threshold value. In such an instance, the locked laptop may be carried within the proximity of the unlocked smartwatch. The smartwatch may detect the laptop based on pre-stored registration information. The user 110 may touch the locked laptop with the unlocked smartwatch, via a bumping or tapping event, and the laptop may be unlocked, as indicated by the third unlock icon 504.

In an embodiment, the smartwatch and/or the tablet may be operable to change the state of the laptop from the unlocked state to a locked state. Such a change in the state of the laptop may be performed when a hardware or software button at the smartwatch and/or the tablet is activated. In an embodiment, the change in the state of the laptop may be performed via a GUI rendered at a display screen of the smartwatch and/or the tablet.

In an embodiment, the user 110 may unfasten the smartwatch. Consequently, the state of both the tablet and the laptop may change from the unlocked state to a locked state. In an embodiment, the laptop may be operable to change the state of the smartwatch and/or the tablet based on one or more pre-specified events. The one or more pre-specified events may include a tapping event between the laptop and the tablet, a tapping event between the laptop and the smartwatch, an activation event of hardware or software button at the laptop, and/or the like.

Figure 6:
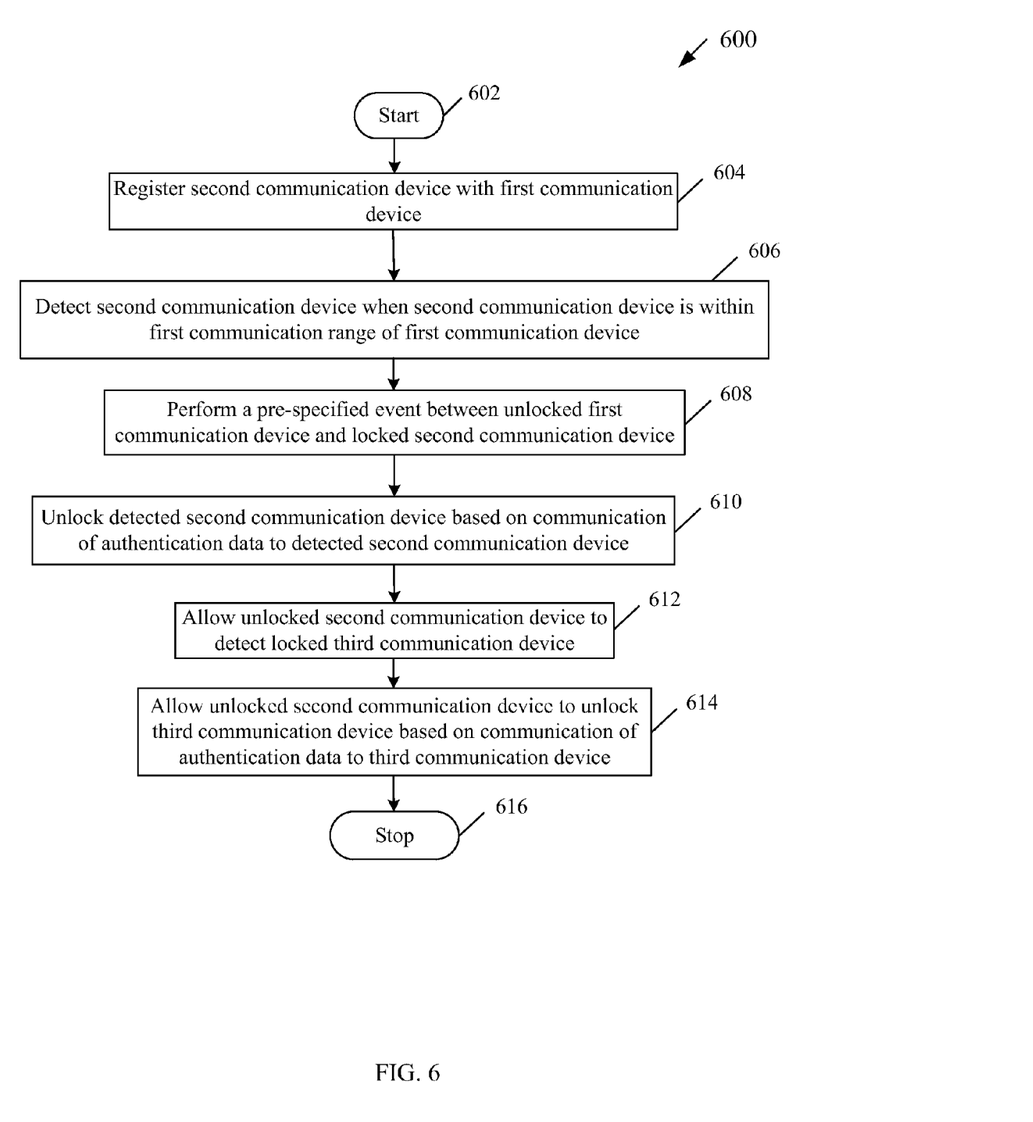
FIG. 6 is a flow chart illustrating an exemplary method for device authentication, in accordance with an embodiment of the disclosure.

FIG. 6 is a flowchart illustrating an exemplary method for device authentication, in accordance with an embodiment of the disclosure. FIG. 6 is described in conjunction with elements of FIG. 1 to FIG. 5. The method 600 may be implemented in the first communication device 102, which may be communicatively coupled with the second communication device 104 and the third communication device 106.

The method 600 begins at step 602 and proceeds to step 604. At step 604, the second communication device 104 may be registered with the first communication device 102. At step 606, the second communication device 104 may be detected when the second communication device 104 is within the first communication range of the first communication device 102. The first communication device 102 may be in an unlocked state and the second communication device 104 may be in a locked state. At step 608, a proximity operation, such as a tapping event, may be performed between the unlocked first communication device 102 and the locked second communication device 104. At step 610, the detected second communication device 104 may be unlocked based on communication of the authentication data to the detected second communication device 104. At step 612, the unlocked second communication device 104 may be allowed to detect the locked third communication device 106 within the second communication range. At step 614, the unlocked second communication device 104 may be allowed to unlock the third communication device 106, based on communication of the authentication data to the third communication device 106. The control passes to end step 616.

In accordance with an embodiment of the disclosure, the system for device authentication may comprise one or more processors, such as the processor 202 (FIG. 2), in a first communication device 102 (FIG. 1). The processor 202 (FIG. 2) may be operable to detect a second communication device 104 (FIG. 1) within the first communication range of the first communication device 102. The first communication device 102 may be in an unlocked state and the second communication device 104 may be in a locked state. Authentication data may be communicated to unlock the detected second communication device 104.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for device authentication. The at least one code section in an first computing device may cause the machine and/or computer to perform the steps, which may comprise detecting a second communication device within a first communication range of a first communication device. The first communication device may be in an unlocked state and the second communication device may be in a locked state. Authentication data may be communicated to unlock the detected second communication device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to various embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:
1. A system for device authentication, comprising:
 at least one hardware processor in a first communication device, wherein said at least one hardware processor is configured to:
  detect a second communication device within a first communication range of said first communication device, wherein said first communication device is in an unlocked state and said second communication device is in a locked state;

communicate an encapsulated message, to said second communication device, to modify a first state of said second communication device from said locked state to said unlocked state,
    wherein said encapsulated message encapsulates authentication data encrypted based on a random key value,
    wherein said random key value is encrypted based on a public key value; and
modify said first state of said second communication device from said unlocked state to said locked state, based on being unfastened from a worn position of said first communication device.

2. The system according to claim 1, wherein said at least one hardware processor is further configured to generate said random key value.

3. The system according to claim 1, wherein said at least one hardware processor is further configured to modify a second state of said first communication device from said locked state to said unlocked state, based on a tap operation between said second communication device in said unlocked state and said first communication device in said locked state.

4. The system according to claim 1, wherein said at least one hardware processor is further configured to modify said first state, of said second communication device, to one of said unlocked state or said locked state based on one of a hardware button or a software button of said first communication device is activated.

5. The system according to claim 1, wherein said at least one hardware processor is further configured to modify said first state, of said second communication device, to one of said unlocked state or said locked state, via a user interface rendered on said first communication device.

6. The system according to claim 1, wherein said second communication device communicates said encapsulated message to a third communication device, wherein said third communication device is detected by said second communication device, wherein said second communication device is in said unlocked state and said third communication device is in said locked state.

7. The system according to claim 6, wherein said second communication device, within said first communication range, is detected by said first communication device via a first wireless communication protocol, and
    wherein said third communication device, within a second communication range, is detected by said second communication device via a second wireless communication protocol.

8. The system according to claim 7, wherein at least one of said first wireless communication protocol or said second wireless communication protocol is a short-range communication protocol.

9. The system according to claim 6, wherein said second communication device modifies a third state of said third communication device from said locked state to said unlocked state based on said encapsulated message.

10. The system according to claim 1, wherein said at least one hardware processor is further configured to communicate said encapsulated message to a third communication device to modify a third state of said third communication device from said locked state to said unlocked state, wherein said third communication device is within said first communication range of said first communication device.

11. The system according to claim 1, wherein said encapsulated message is communicated based on said second communication device is touched with said first communication device.

12. The system according to claim 1, wherein said second communication device is registered with said first communication device based on registration information communicated from said second communication device to said first communication device.

13. The system according to claim 12, wherein said registration information comprises at least one of user profile data or device profile data of said second communication device.

14. The system according to claim 12, wherein said registration information comprises a personal identification number of said second communication device.

15. The system according to claim 1, wherein said at least one hardware processor is further configured to modify a second state of said first communication device to one of said unlocked state or said locked state, based on a duration of inactivity of said first communication device that exceeds a threshold.

16. The system according to claim 1, wherein said at least one hardware processor is further configured to modify a second state of said first communication device from said unlocked state to said locked state based on a modification in a physical configuration of said first communication device.

17. A method for device authentication, comprising:
in a first communication device:
    detecting a second communication device within a first communication range of said first communication device, wherein said first communication device is in an unlocked state and said second communication device is in a locked state;
    communicating an encapsulated message, to said second communication device, to modify a first state of said second communication device from said locked state to said unlocked state,
        wherein said encapsulated message encapsulates authentication data encrypted based on a random key value,
        wherein said random key value is encrypted based on a public key value; and
    modifying said first state of said second communication device from said unlocked state to said locked state, based on being unfastened from a worn position of said first communication device.

18. The method according to claim 17, further comprising communicating said encapsulated message to a third communication device, wherein said third communication device is detected by said second communication device within a second communication range, and wherein said second communication device is in said unlocked state and said third communication device is in said locked state.

19. The method according to claim 18, further comprising modifying a third state of said third communication device from said locked state to said unlocked state, based on said encapsulated message.

20. The method according to claim 17, further comprising communicating said encapsulated message to a third communication device to modify a third state of said third communication device from said locked state to said unlocked state, wherein said third communication device is within said first communication range of said first communication device.

21. The method according to claim 17, further comprising generating said random key value.

22. A non-transitory computer-readable storage medium having stored thereon computer-executable instructions that, when executed by a processor, cause a computer to execute operations, the operations comprising:
   in a first communication device:
      detecting a second communication device within a first communication range of said first communication device;
      modifying a first state of said second communication device from a locked state to an unlocked state, based on communication of an encapsulated message to said second communication device,
         wherein said encapsulated message encapsulates authentication data encrypted based on a random key value, and
         wherein said random key value is encrypted based on a public key value; and
      modifying said first state of said second communication device from said unlocked state to said locked state, based on being unfastened from a worn position of said first communication device.

* * * * *

UNITED STATES PATENT AND TRADEMARK OFFICE
CERTIFICATE OF CORRECTION

PATENT NO. : 9,729,522 B2
APPLICATION NO. : 14/563570
DATED : August 8, 2017
INVENTOR(S) : Charles McCoy, True Xiong and Clay Fisher It is certified that error appears in the above-identified patent and that said Letters Patent is hereby corrected as shown below:

On the Title Page

Under Item (73), "Assignee: Sony Corporation, Tokyo (JP)" should be -- Assignee: Sony Corporation, Tokyo (JP); Sony Network Entertainment International LLC, Los Angeles, CA --

Signed and Sealed this
Twenty-second Day of May, 2018

Andrei Iancu
*Director of the United States Patent and Trademark Office*